US008648550B2

(12) United States Patent
Staab

(10) Patent No.: US 8,648,550 B2
(45) Date of Patent: Feb. 11, 2014

(54) AMBIENT LIGHT SENSOR AUTO-CALIBRATION IN A LIGHTING CONTROL SYSTEM

(75) Inventor: David R. Staab, Los Gatos, CA (US)

(73) Assignee: Zilog, Inc., Milpitas, CA (US)

( * ) Notice: Subject to any disclaimer, the term of this patent is extended or adjusted under 35 U.S.C. 154(b) by 410 days.

(21) Appl. No.: 12/661,205

(22) Filed: Mar. 13, 2010

(65) Prior Publication Data

US 2011/0221350 A1   Sep. 15, 2011

(51) Int. Cl.
H05B 37/00 (2006.01)
(52) U.S. Cl.
USPC ............................ 315/312; 315/295; 315/158
(58) Field of Classification Search
USPC ................... 315/154, 158, 312, 295
See application file for complete search history.

(56) References Cited

U.S. PATENT DOCUMENTS

| 3,944,979 | A | * | 3/1976 | Kwok | 382/274 |
|---|---|---|---|---|---|
| 5,701,058 | A | * | 12/1997 | Roth | 315/158 |
| 5,978,364 | A | * | 11/1999 | Melnik | 370/320 |
| 6,388,399 | B1 | * | 5/2002 | Eckel et al. | 315/312 |
| 7,608,807 | B2 | | 10/2009 | Hick et al. | 250/205 |
| 2007/0024570 | A1 | * | 2/2007 | Kumamoto | 345/102 |
| 2010/0176733 | A1 | * | 7/2010 | King | 315/158 |
| 2010/0244706 | A1 | * | 9/2010 | Steiner et al. | 315/149 |
| 2010/0277107 | A1 | * | 11/2010 | Baaijens et al. | 315/320 |

OTHER PUBLICATIONS

California Energy Commission, *Daylight Harvesting Made Simple*, dated Sep. 2009, 2 pages.
Notes on daylight-controlled light regulation, downloaded Feb. 2010, pp. 56-71.
Dr. Christine Ruth, Andreas Vogler, Wilhelm Karsten, Ambient Light Sensors: General Application Note, dated Jun. 29, 2006, pp. 1-8.

* cited by examiner

*Primary Examiner* — Douglas W Owens
*Assistant Examiner* — Henry Luong
(74) *Attorney, Agent, or Firm* — Imperium Patent Works; T. Lester Wallace; Darien K. Wallace

(57) ABSTRACT

A lighting system includes a master that controls a plurality of light fixtures via wireless RF communications. An ambient light sensor in the master is used to monitor total ambient light and to prevent excessive illumination. In an auto-calibration process, the master makes ambient light measurements A, B and C when the light fixtures are illuminating an area at a minimum setting, at a maximum setting, and at an intermediate setting, respectively. A first threshold is set to be approximately (B−A). A second threshold is set to be slightly larger than (B−A)+(B−C). In normal system operation, total ambient light measurements are taken and compared to the two thresholds. In one example, if detected brightness is lower than the first threshold then the system is set at its maximum illumination setting, whereas if detected brightness is greater than the second threshold then the system is set at its intermediate illumination setting.

24 Claims, 5 Drawing Sheets

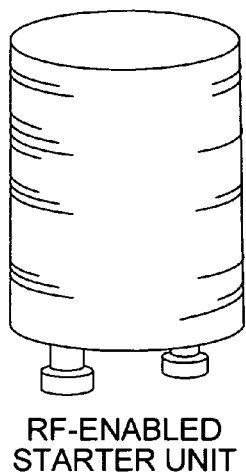
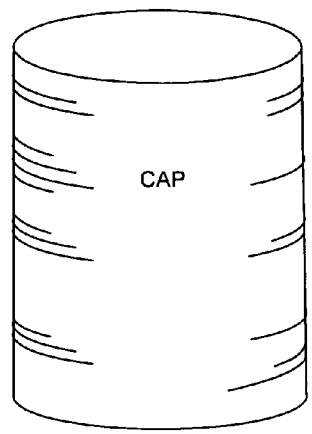
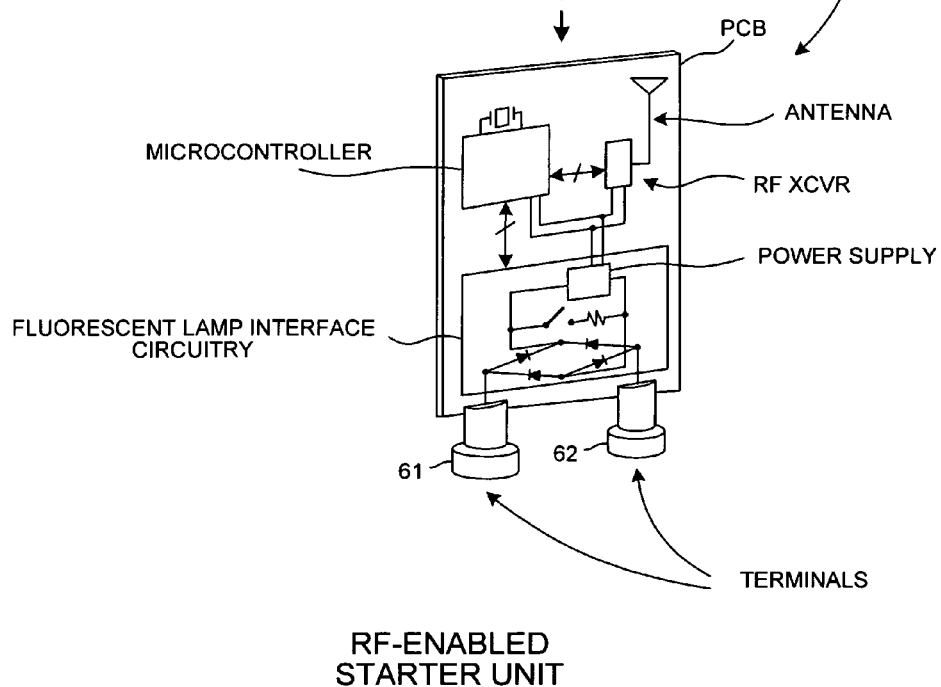

AMBIENT LIGHT SENSOR AUTO-CALIBRATION IN A LIGHTING CONTROL SYSTEM

TECHNICAL FIELD

The present disclosure relates to the calibration and operation of lighting systems that employ ambient light sensors.

BACKGROUND INFORMATION

Many lighting control network systems, including wireless lighting control systems and wired lighting control systems, include both an Ambient Light Sensor (ALS) and an occupancy detector. In a DALI (Digital Addressable Lighting Interface) system, for example, an ALS may be coupled to the bus as a first sensor node and an occupancy detector may be coupled to the bus as a second sensor node. The occupancy detector may be a PIR (Passive InfraRed) sensor. The presence of a person may also be detected in other ways. To conserve electrical energy, if no person is detected to be present in an area, then electrical lamps in the area are turned off and remain off. If, however, a person is detected to be present in the area, then artificial illumination is provided by the lamps as necessary. Many systems have the ability to vary the amount of artificial light provided. Conventional dimmers used with incandescent bulbs may be remotely controlled. Dimmable ballasts can be used to dim fluorescent lamps. If many lamps are used to illuminate an area, then some of the lamps can be turned off and others turned on such that the overall amount of artificial light provided is adjustable. Regardless of how the adjustment of the amount of artificial light is performed, the ALS sensor is typically used to detect the overall amount of ambient light and control how much artificial light is provided so that more artificial illumination than is needed is not provided. This is sometimes referred to as "daylight harvesting". For example, if the area with full artificial light illumination would have a brightness that exceeds the desired brightness level, then the system does not illuminate the area with full artificial illumination but rather uses a lesser amount of artificial illumination such that the overall brightness (due to any natural light as well as due to artificial light) is not greater than necessary. As the amount of background natural light changes, so too does the proper amount of artificial light change. The ALS sensor provides ambient light measurement data to the system so that the system can vary the amount of artificial light.

There are many different types of lighting control systems that have these general characteristics. In one type of system, there are two brightness thresholds: an upper threshold, and a lower threshold. If the detected brightness is initially between the two thresholds and then transitions to be below the lower threshold, then an action of turning the lamps on to their maximum brightness is taken. If the detected brightness is initially between the two thresholds and then transitions to be above the upper threshold, then an action of dimming the lamps is taken. The system works well, but the setting of the thresholds can be difficult. Because a person manually adjusts the two thresholds, the spread between the two thresholds is also manually adjusted and can be set improperly. In adjusting a threshold, the user may obtain no visible feedback from the system. How much the threshold is being changed is therefore difficult to determine. The person may have to climb a ladder to interact manually with an adjustable system component multiple times. The person may have to watch and monitor the system, adjusting it several times before the system is suitably calibrated for its particular environment and particular configuration.

U.S. Pat. No. 7,608,807 describes a problem of a person who is commissioning a system having to monitor the system over a long period of time in order to calibrate the system properly. There is also another problem in a two threshold system. The thresholds can be set such that the system oscillates between illumination settings. Despite these problems with manual adjustment, the flexibility of manual adjustment is provided because the thresholds may depend on many factors. System performance may, for example, depend on the structure of the building in which the system is installed, the contents of the building, the time of year and day, the types of artificial lighting used, and the number of lamps ganged together. As lamps burn out, lamps having different characteristics may be used as replacements and lighting system performance may change. Mechanisms for auto-calibrating ALS thresholds in such lighting systems are known, but these mechanisms are generally slow, semi-nonfunctional, undesirably complex, cumbersome and/or expensive.

SUMMARY

A lighting control system includes a master unit and plurality of light fixtures. The master unit is a low-cost battery-powered unit that controls the light fixtures by wireless RF communications. An Ambient Light Sensor (ALS) within the master unit is used to monitor total ambient light (brightness) in an area and to prevent excessive artificial illumination of the area, thereby reducing energy consumption.

In a novel auto-calibration method, ambient light measurements A, B and C are taken when the light fixtures are illuminating the area at a minimum illumination setting, at a maximum illumination setting, and at an intermediate illumination setting, respectively. The master unit can obtain the measurement information A, B, and C by making ambient light brightness measurements itself, or in combination with other master units, or the master unit can obtain the measurement information A, B and C by receiving the information from another device or devices that made the measurements.

Regardless of how the measurement information A, B and C is obtained by the master unit, the master unit sets a first threshold value to be approximately (B−A). It is understood that the first threshold value does not have to be exactly B−A, but rather may be approximately B−A such as, for example, within plus or minus twenty percent of B−A. The master unit also sets a second threshold value to be slightly larger than [(B−A)+(B−C)]. Again, it is understood that the second threshold value does not have to be exactly [(B−A)+(B−C)], but rather may be in a range from approximately [(B−A)+(B−C)] up to a value that is forty percent greater than [(B−A)+(B−C)]. The second threshold value may be set by adding a margin value M to the quantity [(B−A)+(B−C)].

Then after the auto-calibration method is completed, when the lighting system is operating, ambient light measurements of the area are taken periodically. Each ambient light measurement includes a natural light component and an artificial light component. If the measured ambient light is less than the first lower threshold value, then the master unit causes the light fixtures to illuminate the area at the lighting system's maximum illumination setting. If the measured ambient light is greater than the second higher threshold value, then the master unit causes the light fixtures to illuminate the area at the lighting system's intermediate illumination setting. The spread between the two threshold values is automatically set to be slightly greater than the change in illumination due to a changing of the illumination setting of the lighting system from the intermediate illumination setting to the maximum illumination setting. The threshold values are quickly, easily, and automatically set as compared to the how thresholds are manually set in a conventional system, and as compared to other conventional systems that take many hours to auto-calibrate.

The auto-calibration method sees use in lighting systems where the illumination setting is adjusted by changing the number of light fixtures that are turned on versus the number of light fixtures that are turned off, and in lighting systems where the illumination setting is adjusted by dimming individual lamps. The auto-calibration method is extendable to the automatic setting of more than two threshold values. In one example, the spread between multiple intermediate thresholds is set to be slightly more than the detected change in brightness when the lighting system is dimmed one dimming increment. The ALS mechanism used in the method for making brightness measurements may involve only one ambient light sensor in the master unit, or alternatively may involve receiving ambient light sensor measurements taken remotely by other devices (for example, other master units).

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is a perspective view of an RF-enabled starter unit of one of the light fixtures of the lighting system of FIG. 1.

FIG. 4 is an exploded view of the RF-enabled starter unit of FIG. 3.

DETAILED DESCRIPTION

Reference will now be made in detail to background examples and some embodiments of the invention, examples of which are illustrated in the accompanying drawings.

Figure 1:
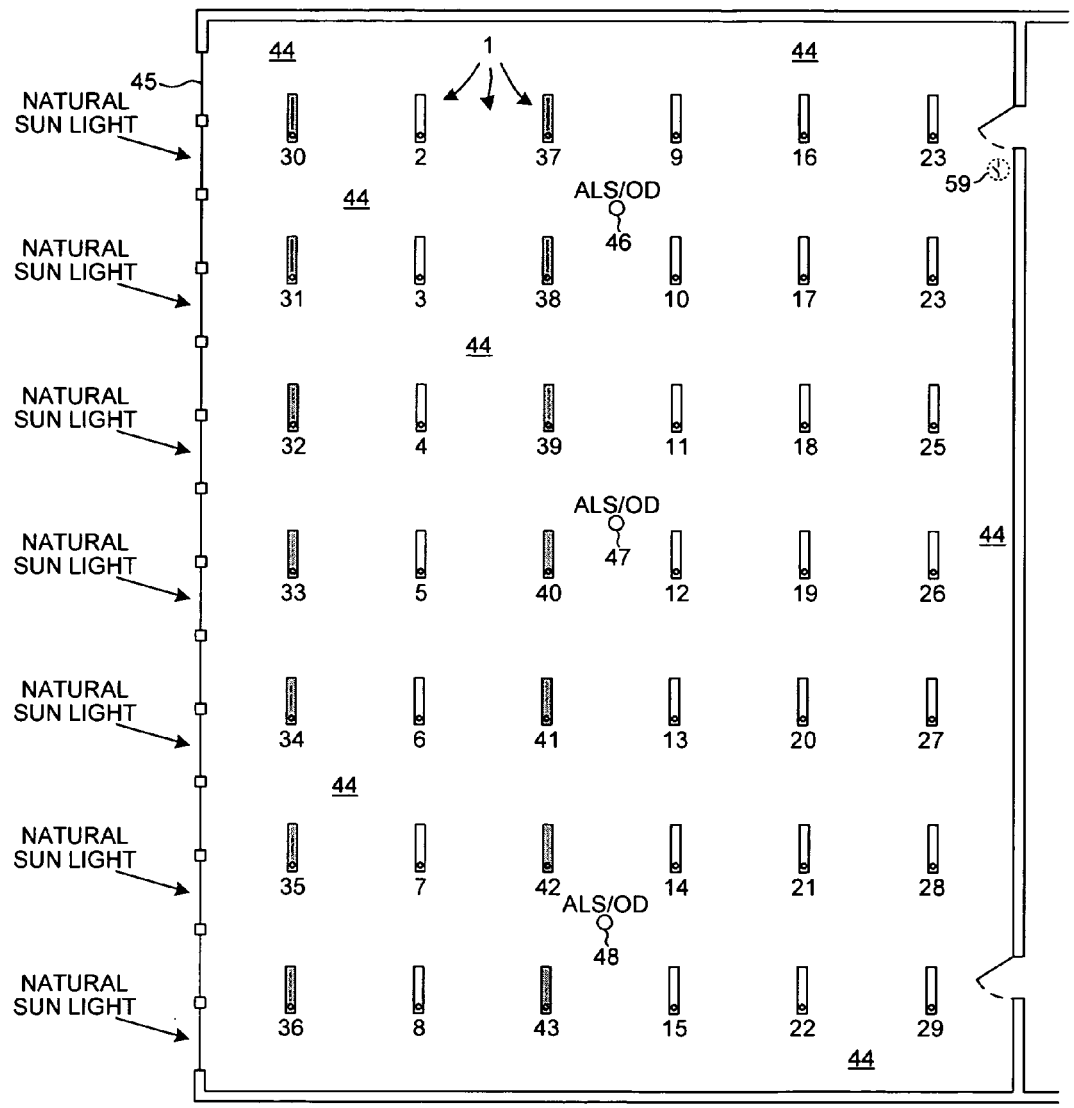
FIG. 1 is a simplified top-down diagram of a room within which a lighting system is deployed.

FIG. 1 is a diagram of a lighting control system 1 in accordance with one novel aspect. Lighting control system 1 has a dimming capability. In the illustrated example, there are forty-two fluorescent light fixtures 2-43 disposed in a room 44 of a building. The left side of the room has a number of windows 45 that let natural sunlight into the room during the day. In addition to the light fixtures, system 1 includes three master units 46-48. Each of the master units and each of the fluorescent light fixtures includes a Radio-Frequency (RF) transceiver. The master units 46-48 intercommunicate with one another and with the light fixtures 2-43 using wireless RF communication such that the master units can control individual light fixtures to be on or off.

In the present example, the light fixtures 2-43 are grouped into two groups. The light fixtures 2-29 are in the first group or the "standard" group. Light fixtures 30-43 are in the second group or the "dimmer" group. All of the light fixtures of a group are turned on and turned off together. (In this patent document when it is said that a "light fixture" is turned on or turned off, this is shorthand common parlance and means that the lamps of the light fixture are turned on or turned off.) Each master unit includes an Ambient Light Sensor (ALS) as well as a Passive InfraRed Sensor (PIR) motion sensor/Occupancy Detector (OD). If one of the master units detects motion of an infrared source using its PIR occupancy detector, it communicates this information to the other master units via a wireless communication. Master unit 47 is therefore aware of whether any part of room 44 is occupied. The master units 46 and 48 also share their ambient light sensor output information such that master unit 47 determines a common ambient brightness measurement value. The master units cooperate together such that they control the light fixtures in the room to operate as the two groups of light fixtures. A decision as to whether to turn on one group of light fixtures, both groups of light fixtures, or neither group of light fixtures is made by one of the master units 47. The other two master units 46 and 48 in this example control individual light fixtures but do so in accordance with the decision made by master unit 47.

Figure 2:
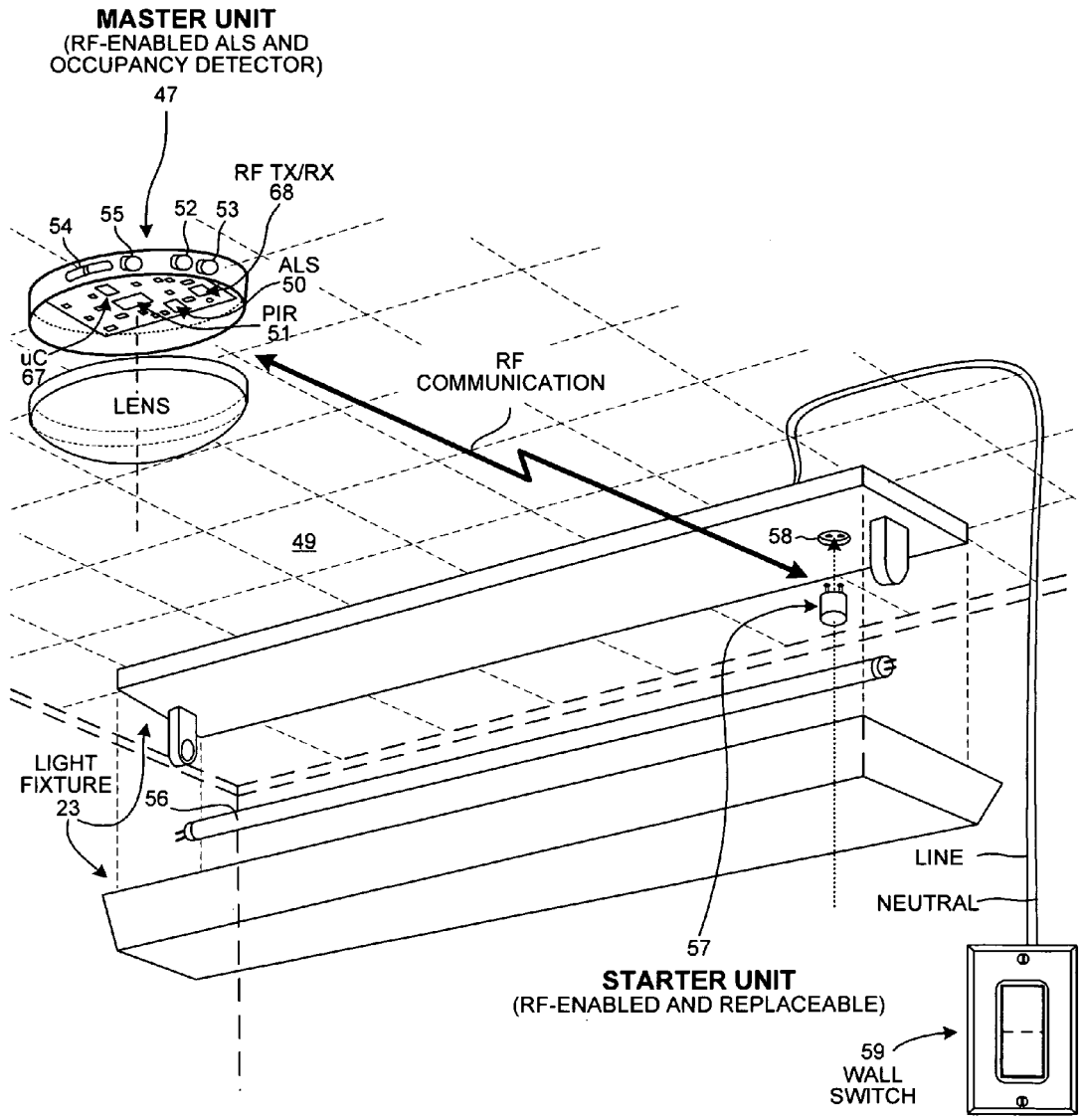
FIG. 2 is a perspective diagram of one of the master units and one of the light fixtures of the lighting system of FIG. 1.

FIG. 2 is a simplified perspective diagram of master unit 47 and one of the light fixtures 23. The master unit 47 is a battery-powered unit that is attached to the ceiling 49 of room 44. Master unit 47 includes a microcontroller (uC) 67 with flash memory, an Ambient Light Sensor (ALS) 50, a PIR motion sensor (occupancy detector) 51, an RF transceiver 68, an association button 52 for the first group of light fixtures, an association button 53 for the second group of light fixtures, a slider selector 54, and a button 55 for selecting an option set by the slider selector. Slider selector 54 can also be implemented using DIP switches. In one example, RF transceiver 68 is a part number SX1211, available from Semtech Corporation, 200 Flynn Road, Camarillo, Calif. 93012; the ALS 50 is a part number TEPT5700, available from Vishay Electronic GmbH, Geheimrat-Rosenthal-Str. 100, 95100 Selb, Germany; the PIR sensor 51 is a part number IRA-E911, available from Crow Electronic Engineering, Ltd., 12 Kinereth Street, 70100 Airport City, Israel; and the microcontroller 67 is a part number Z8F2480, available from Zilog, Inc, 6800 Santa Teresa Blvd., San Jose, Calif. 95119. Microcontroller 67 has an input analog multiplexer and associated analog-to-digital converter that digitizes the ALS. The PIR motion sensor output is digitized by a CT1015 interface ASIC and the CT1015 in turn forwards the digitized information to microcontroller 67. The CT1015 interface ASIC is part of a PIR motion sensor module available from Crow Electronic Engineering, Ltd.

The light fixture 23 (also referred to simply as a "light") includes a fluorescent lamp 56, and an RF-enabled replaceable starter unit 57. Starter unit 57 plugs into an accommodating socket 58 in fixture 23. The RF-enabled replaceable starter unit includes starter circuitry for igniting the fluorescent lamp 56, and for extinguishing the fluorescent lamp 56. The RF-enabled starter unit 57 includes an RF transceiver that it uses to communicate with master unit 47. The RF-enabled starter unit 57 receives RF communications from master unit 47 that instruct the starter unit to turn on (ignite) lamp 56 or to turn off (extinguish) lamp 56. This light fixture, as well as all other light fixtures in the room, are powered from AC wall power when the wall paddle switch 59 is positioned to turn on the lights.

FIG. 3 is a more detailed diagram of starter unit 57. FIG. 4 is an exploded view of starter unit 57. Terminals 61 and 62 of the starter unit removably plug into socket 58 (see FIG. 2) in the light fixture 23.

Figure 5:
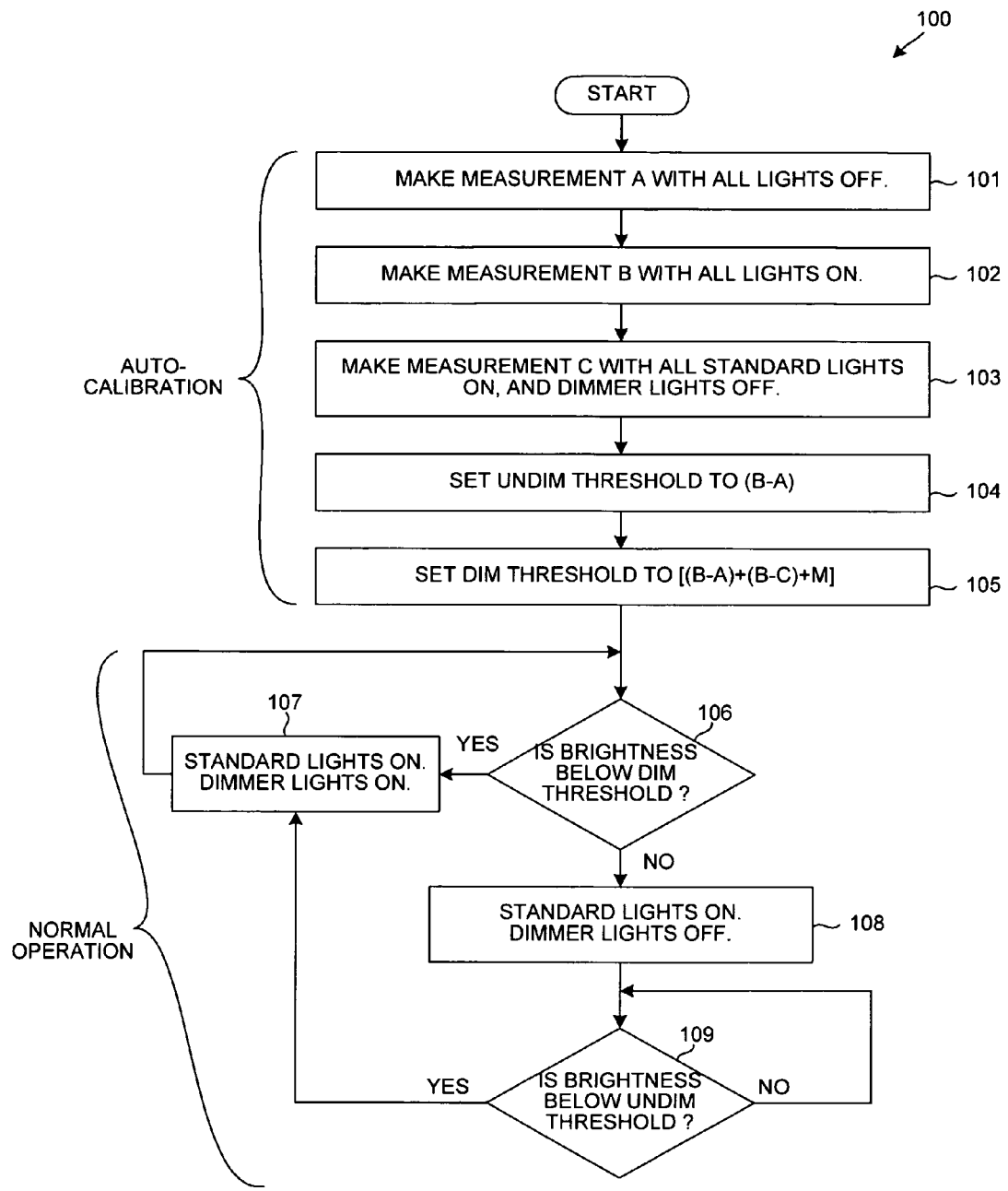
FIG. 5 is a simplified flowchart of a method 100 in accordance with one novel aspect. Method 100 includes an auto-calibration method and a normal operation method. The normal operation method uses thresholds established in the auto-calibration method.

FIG. 5 is a simplified flowchart that illustrates a method 100 of auto-calibrating an Ambient Light Sensor (ALS) within a lighting control system. Method 100 is orchestrated by a microcontroller in master unit 47. The method involves two brightness threshold values. The first brightness threshold value is the lower brightness threshold value and is referred to here as the "undim threshold". If light switch 59 is set to turn on the light fixtures in the room and if the master units detect motion in the room (detects occupancy), then if the detected brightness in the room is below the undim threshold the master unit 47 causes all the light fixtures (both the group of standard light fixtures and the group of dimmer light fixtures) to be turned on. The second brightness threshold value is the higher brightness threshold value and is referred to here as the "dim threshold". If light switch 59 is set to turn the light fixtures in the room on and if the master units detect motion in the room (detects occupancy), then if detected brightness in the room is above the dim threshold then master unit 47 causes the group of dimmer light fixtures to be turned off but causes the group of standard light fixtures to remain on. The setting of these two threshold values in an auto-calibration method, the two threshold values, and the operation of lighting control system 1 using these two threshold values is explained below in connection with an operational scenario set forth in FIG. 6.

Figure 6:
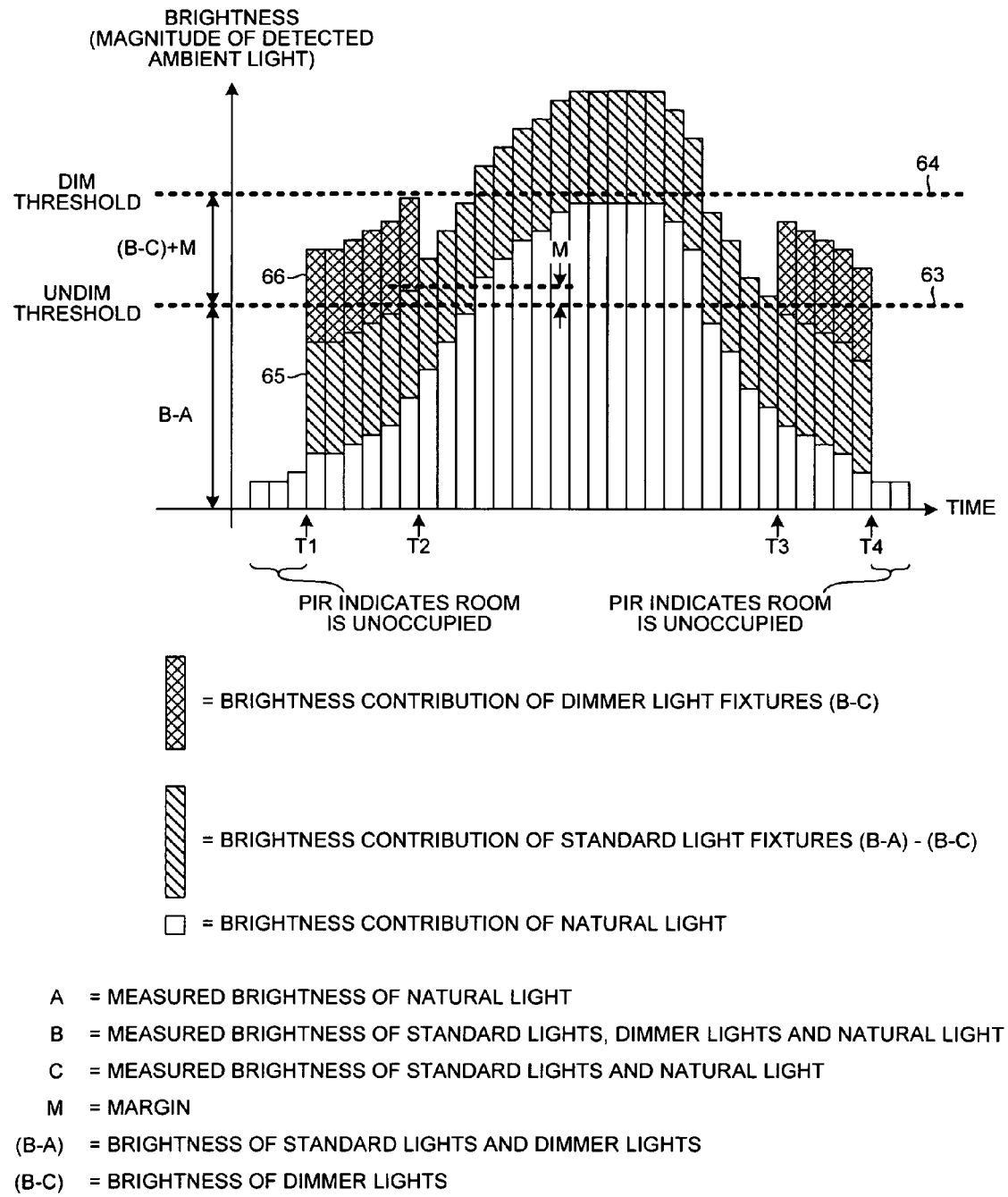
FIG. 6 is a diagram that illustrates an operational scenario of the lighting system of FIG. 1.

FIG. 6 illustrates detected ambient light brightness in the vertical dimension and time in the horizontal dimension. The height of the un-shaded vertical bars indicate the magnitude of natural light in room 44. The left of the diagram represents the time of late night/early morning. As the sun rises, natural light in the room increases as indicated by the increasing heights of the un-shaded vertical bars. The natural light in the room reaches a maximum around noon. In the afternoon the magnitude of natural light decreases until the end of the day. The dashed horizontal line 63 represents the "undim threshold". The dashed horizontal line 64 represents the "dim threshold".

The RF starter units of the light fixtures that are to be in the first group of standard light fixtures are registered to a master unit by pressing a "Group 1 Registration" button 52 on master unit 47. Button 52 is the registration button for the standard group on master unit 47. Similarly, the RF starter units of the light fixtures that are to be in the second group of dimmer light fixtures are registered to each other and to a master by pressing a "Group 2 Registration" button 53 on master unit 47. Button 53 is the registration button for the dimmer group on master unit 47. There are many different ways that the two groups of light fixtures can be registered separately to the master units. For additional information on the registration process, see: U.S. patent application Ser. No. 12/587,152, entitled "Registering A Replaceable RF-Enabled Fluorescent Lamp Starter Unit To A Master Unit", filed Oct. 1, 2009, by Staab et al., published as U.S. Pat. Pub. No. 2011/0080091 (the subject matter of which is incorporated herein by reference).

Once all the light fixtures have been grouped into either the standard group or the dimmer group, and once the registration process is completed, then the auto-calibration method is initiated by moving the slider selector 54 to the "calibrate" position and pressing button 55. In a first step (step 101) of the auto-calibration method, the master units 46-48 cooperate under the direction of master unit 47 to make a measurement of ambient brightness in room 44 in a condition in which all light fixtures are turned off. Master unit 47 orchestrates the auto-calibration operation, commands the other master units 46 and 48 to turn off light fixtures controlled by those master units, collects the ALS sensor data from the other master units 46 and 48, and makes a composite measurement determination A of the brightness in the room when all the light fixtures (standard and dimmer) are turned off.

In a second step (step 102), the master units 46-48 cooperate to make a measurement of ambient brightness in room 44 in a condition in which all the light fixtures (standard and dimmer) are turned on. In this example, after the light fixtures are turned on, about five minutes is allowed to pass so that the lamps of the fixtures achieve stable brightness. Master unit 47 orchestrates the auto-calibration operation, commands the other master units 46 and 48 to turn on light fixtures controlled by those master units, collects the ALS sensor data from the other master units 46 and 48, and makes a composite measurement determination B of the brightness in room 44 when all the light fixtures (standard and dimmer) are turned on.

In a third step (step 103), the master units 46-48 cooperate to make a measurement of ambient brightness in room 44 in a condition in which all standard light fixtures are turned on but all dimmer light fixtures are turned off. Again, master unit 47 orchestrates the auto-calibration operation, commands the other master units to turn on their standard light fixtures, commands the other master units to turn off their dimmer light fixtures, collects the ALS sensor data from the other master units, and makes a composite measurement determination C of the brightness in room 44 when all standard light fixtures are on and all dimmer light fixtures are off.

Master unit (step 104) subtracts measurement value B from measurement value A and sets the "undim threshold" value to this (B−A) value. Master unit (step 105) calculates the value [(B−A)+(B−C)+M] and sets the "dim threshold" value to this value. The value M in this example is a fixed margin value. Value M may, for example, be a constant or may be a percentage (for example, ten percent) of the quantity (B−C). The determinations of the thresholds involve mathematical calculations performed by the microcontroller 67 in master unit 47. In one advantageous aspect, the auto-calibration method represented by steps 101-105 are performed in rapid succession in a relatively short amount of time (for example, in less than twenty minutes) and this auto-calibration method can be done at any time of day or night.

Steps 106-109 are steps in the normal operation of system 1 after the auto-calibration method has been performed. How system 1 works in the operational scenario of FIG. 6 is explained in connection with the steps 106-109 of FIG. 5. At the left of FIG. 6, in the very early morning hours, the light switch 59 is either in position to switch off the light fixtures in the room or no motion is being detected by the master units. None of the light fixtures (standard or dimmer) are therefore turned on. This situation is represented by the leftmost three un-shaded bars in FIG. 6. Then, at time T1, the master units detect motion in the room when the light switch is in the on position. The master units 46-48 cooperate to make periodic ambient light measurements. Master unit 47 receives the measurement values from the other master units and generates periodic composite ambient light measurements. The magnitude of such a composite ambient light measurement is represented by the height of the top of the fourth natural light bar in FIG. 6. In step 106 of FIG. 5, the determination is made that the brightness is below the lower DIM threshold 63. Master unit 47 therefore causes both the standard light fixtures and the dimmer light fixtures in the room to be turned on (step 107). In FIG. 6, the turning on of the standard light fixtures is represented by hatched bar 65. The height of hatched bar 65 indicates the amount of brightness that is due to the standard light fixtures being turned on. In FIG. 6, the turning on of the dimmer light fixtures is represented by cross-hatched bar 66. The height of bar 66 indicates the amount of brightness that is due to the dimmer light fixtures being turned on. Note that at this point in the example the total amount of detected ambient light in room 44 exceeds the undim threshold 63, but is less than the dim threshold 64. This condition of having all light fixtures on persists over time as time progresses to the right in FIG. 6. As the morning passes, the amount of natural light in room 44 due to sunlight coming through windows 45 increases.

At time T2, a composite ambient light sensor measurement is made. Master unit 47 determines the measured brightness to exceed the dim threshold 64. In FIG. 5, the brightness is no longer below the dim threshold, so processing proceeds from step 106 to step 108. Master unit 47 causes the standard light fixtures to remain on, but causes the dimmer light fixtures to be turned off. In FIG. 6, note that immediately after time T2 there is no cross-hatched bar to represent any light contribution due to dimmer light fixtures. The dimmer light fixtures are turned off. The amount of ambient light detected drops by the magnitude of the height of the cross-hatched bars (height B–C), but this drop is not as great as the separation between the two thresholds 63 ad 64. The resulting brightness after turning off the dimmer light fixtures is therefore above the undim threshold as illustrated in FIG. 6.

As illustrated in FIG. 5, the system checks (step 109) to determine whether the brightness in the room is below the undim threshold. If the brightness in the room is not below the undim threshold, then processing remains at step 109. In the example of FIG. 6, as time passes in the afternoon the overall amount of light (natural and artificial) in the room continues to decrease as the amount of natural light coming into the room through the windows decreases.

Finally at time T3 in FIG. 6, when the system makes a measurement of the brightness in the room, the measured brightness is below the undim threshold 63. Processing proceeds to step 107. Master unit 47 causes the standard light fixtures to be turned on as well as the dimmer light fixtures. This is represented in FIG. 6 by the reappearance of the cross-hatched bars after time T3. The increase in light in the room due to the turning on of the dimmer light fixtures is represented by the height (B–C) of the cross-hatched bars. This height is less than the separation between the two thresholds. When the dimmers are turned on, the new larger amount of light does not exceed the upper dim threshold 64. As illustrated in FIG. 5, processing proceeds back up to step 106. As time passes, the amount of natural light passing into the room through the windows continues to decrease as illustrated in FIG. 6. Because the brightness in the room is below the upper dim threshold 64, processing continues to loop through steps 106 and 107. Finally at time T4 the light switch 59 in the room is set to the off position, or no motion is detected in the room due to occupants in the building going home at the end of the day. In either case, all light fixtures (standard and dimmer) are turned off. In the case of the light switch being left in the on position but all the occupants leaving the building for the day, master unit 47 detects the lack of motion and causes the light fixtures to be turned off. In the case of light switch 59 being moved to the lights-off position, the light fixtures are turned off due to AC power to the light fixtures (standard and dimmer) being disconnected.

Although the lighting control system described above involves multiple master units cooperating in making an ambient light measurement, other systems are possible. In one system, one master unit makes the ambient light measurements by itself and the other master units (if any) are used primarily for motion detection. A common implementation of the system has only one master unit in a room. Whereas the system described above involves each of multiple master units controlling starter units, other systems involve one master unit that controls all the starter units with the other master units acting as range extenders for motion detection (and possibly for ambient light detection). Although the system described above involves only one dimming increment, the system may have several dimming settings. In addition to the dim and undim thresholds, the system may have additional thresholds between the dim and undim thresholds. If the brightness is detected to cross one of these thresholds, then the illumination setting is changed accordingly by one dimming increment setting.

Measurement information indicative of the brightness in a room can be obtained by taking a single measurement, or can be obtained in more complex ways. For example, multiple measurements can be made while cycling lamps so as to help null out environmental changes that might occur during calibration time. For example, lamps can be turned on and warmed up for five minutes, then cycled multiple times (from all off, to all on, standard lamps only), and then one or more measurements can be taken at each stimulus condition during each cycle. The measurements taken in this way under like conditions are then averaged to obtain the measurement information.

Although certain specific embodiments are described above for instructional purposes, the teachings of this patent document have general applicability and are not limited to the specific embodiments described above. The auto-calibration method is extendable to the automatic setting of more than two threshold values. In one example, the spread between adjacent ones of multiple intermediate thresholds is set to be slightly more than the detected change in brightness when the lighting system is dimmed by one dimming increment. The auto-calibration method sees use in lighting systems where the illumination setting is adjusted by changing the number of light fixtures that are turned on versus the number of light fixtures that are turned off, and in systems where the illumination setting is adjusted by dimming individual light fixtures. Although an example of the auto-calibration method is described above in connection with light fixtures that involve fluorescent lamps, the method applies equally well to light fixtures that involve other types of lamps including incandescent lamps and LED (Light Emitting Diode) lamps. Accordingly, various modifications, adaptations, and combinations of various features of the described embodiments can be practiced without departing from the scope of the invention as set forth in the claims.

What is claimed is:

1. A method comprising:
   (a) obtaining first measurement information A, wherein A is indicative of a brightness within a room when both a first group of lamps and a second group of lamps are off;
   (b) obtaining second measurement information B, wherein B is indicative of a brightness within the room when both the first group of lamps and the second group of lamps are on;
   (c) obtaining third measurement information C, wherein C is indicative of a brightness within the room when the first group of lamps is on and the second group of lamps is off;
   (d) setting a first threshold value to be (B–A);
   (e) setting a second threshold value to be slightly larger than (B–C)+(B–A);

(f) obtaining fourth measurement information D, wherein D is indicative of a brightness within the room when the first group of lamps is on and the second group of lamps is off;
(g) determining that D is smaller than the first threshold value and in response to the determining of (g) causing the second group of lamps to be turned on;
(h) obtaining fifth measurement information E, wherein E is indicative of a brightness within the room when both the first group of lamps and the second group of lamps are on; and
(i) determining that E is larger than the second threshold value and in response to the determining of (i) causing the second group of lamps to be turned off, wherein the determining of (g) and the determining of (i) are performed by a device, wherein the device can cause the first group of lamps to be turned on and off, and wherein the device can cause the second group of lamps to be turned on and off.

2. The method of claim 1, wherein (a), (b), (c), (d), and (e) are all performed in a period of time of less than twenty minutes, and wherein (f), (g), (h) and (i) are performed after the period of time.

3. The method of claim 2, wherein the first threshold value is within plus or minus twenty percent of (B−A), and wherein the second threshold value is within forty percent of (B−C)+(B−A).

4. The method of claim 3, wherein the first group of lamps is a first group of fluorescent lamps, and wherein the second group of lamps is a second group of fluorescent lamps.

5. The method of claim 1, wherein the setting of the first threshold value of (d) involves the device performing a mathematical operation involving B and A.

6. The method of claim 1, wherein the setting of the second threshold value of (e) involves the device performing a mathematical operation involving B and C.

7. The method of claim 1, wherein the device includes an ambient light sensor, and wherein A, B and C are obtained by making a measurement using the ambient light sensor.

8. The method of claim 1, wherein the obtaining of (a) involves receiving ambient light sensing information onto the device via a wireless communication.

9. The method of claim 1, wherein the device causes the second group of lamps to be turned on in (g) by transmitting at least one wireless command from the device.

10. The method of claim 1, wherein the obtaining of (b) is performed before the obtaining of (a).

11. A method comprising:
(a) obtaining first measurement information A, wherein A is indicative of a brightness within a room when a lighting system is set at a minimum illumination setting;
(b) obtaining second measurement information B, wherein B is indicative of a brightness within the room when the lighting system is set at a maximum illumination setting;
(c) obtaining third measurement information C, wherein C is indicative of a brightness within the room when the lighting system is set at an intermediate illumination setting;
(d) setting a first threshold value to be (B−A);
(e) setting a second threshold value to be slightly larger than (B−C)+(B−A);
(f) obtaining fourth measurement information D, wherein D is indicative of a brightness within the room when the lighting system is set at the intermediate illumination setting;
(g) determining that D is smaller than the first threshold value and in response to the determining of (g) causing the lighting system to be set at the maximum illumination setting;
(h) obtaining fifth measurement information E, wherein E is indicative of a brightness within the room when the lighting system is set at the maximum illumination setting; and
(i) determining that E is larger than the second threshold value and in response to the determining of (i) causing the lighting system to be set at the intermediate illumination setting, wherein the determining of (g) and the determining of (i) are performed by a device, wherein the device can change an illumination setting of the lighting system.

12. The method of claim 11, wherein the lighting system includes a plurality of dimmable lamps, and wherein the device changes an illumination setting of the lighting system by changing how at least one of the dimmable lamps is dimmed.

13. The method of claim 11, wherein (a), (b), (c), (d), and (e) are all performed in a period of time of less than twenty minutes, and wherein (f), (g), (h) and (i) are performed after the period of time.

14. The method of claim 11, wherein the obtaining of (b) is performed before the obtaining of (a).

15. An apparatus comprising:
an ambient light sensor functionality;
a Radio Frequency (RF) transceiver; and
a processor that sets a threshold value to be (B−A), wherein A is a first ambient light measurement value obtained when an area was illuminated by a lighting system when the lighting system was set at a minimum illumination setting, wherein B is a second ambient light measurement value obtained when the area was illuminated by the lighting system when the lighting system was set at a maximum illumination setting, wherein the processor causes a third ambient light measurement to be taken when the lighting system is illuminating the area at a setting other than the maximum illumination setting, wherein the third ambient light measurement results in a third ambient light measurement value, and wherein the processor determines that the third ambient light measurement value is smaller than the threshold value and in response to the determining the processor causes a wireless RF command to be sent from the RF transceiver thereby causing the setting of the lighting system to be changed to a higher illumination setting.

16. The apparatus of claim 15, wherein the first, second and third ambient light measurement values are obtained using the ambient light sensor functionality of the device, and wherein the first and second ambient light measurement values are obtained and the threshold value is set in a period of time of less than twenty minutes.

17. The apparatus of claim 16, wherein the processor causes the lighting system to illuminate the area using the minimum illumination setting when the first ambient light measurement value is obtained, and wherein the processor causes the lighting system to illuminate the area using the maximum illumination setting when the second ambient light measurement value is obtained.

18. The apparatus of claim 17, wherein the lighting system includes a plurality of light fixtures, wherein each of the light fixtures includes an RF transceiver, and wherein the processor causes the setting of the lighting system to be changed to the higher illumination setting by causing at least one wireless RF command to be sent out of the RF transceiver of the apparatus and to the RF transceivers of the plurality of light fixtures.

19. The apparatus of claim 15, wherein the threshold value is within plus or minus twenty percent of (B−A).

20. The apparatus of claim 15, wherein the processor sets a second threshold value to be slightly larger than [(B−A)+(B−C)], wherein C is a fourth ambient light measurement value obtained when the area was illuminated by the lighting system when the lighting system was set at an intermediate illumination setting.

21. The apparatus of claim 20, wherein the processor causes a fifth ambient light measurement to be taken when the lighting system is illuminating the area set at the maximum illumination setting, wherein the fifth ambient light measurement results in a fifth ambient light measurement value, and wherein the processor determines that the fifth ambient light measurement value is greater than the second threshold value and in response to the determining the processor causes a wireless RF command to be sent from the RF transceiver thereby causing the setting of the lighting system to be changed to the intermediate illumination setting.

22. The apparatus of claim 15, wherein the apparatus further comprises:
an occupancy detector functionality that detects a lack of motion in the room throughout a period of time, and wherein the processor causes the setting of the lighting system to remain at the minimum illumination setting for substantially all of the period of time regardless of ambient lighting conditions in the room.

23. A method comprising:
(a) obtaining first measurement information A, wherein A is indicative of a brightness within a room when a lighting system is set at a first illumination setting;
(b) obtaining second measurement information B, wherein B is indicative of a brightness within the room when the lighting system is set at a second illumination setting, wherein the lighting system has a plurality of different dimming settings in addition to the first illumination setting and the second illumination setting;
(c) setting a first threshold value to be (B−A);
(d) setting a second threshold value to be a value greater than the first threshold value;
(e) obtaining third measurement information C; and
(f) determining that C is larger than the second threshold value and in response to the determining of (f) causing the setting of the lighting system to be changed from the second illumination setting to one of the dimming settings.

24. The method of claim 23, wherein the obtaining of (b) is performed before the obtaining of (a).

* * * * *